Nov. 2, 1965  K. P. RUTHERFORD  3,215,173
BAG FILLING AND WEIGHING MACHINE
Filed Jan. 29, 1962  4 Sheets-Sheet 1
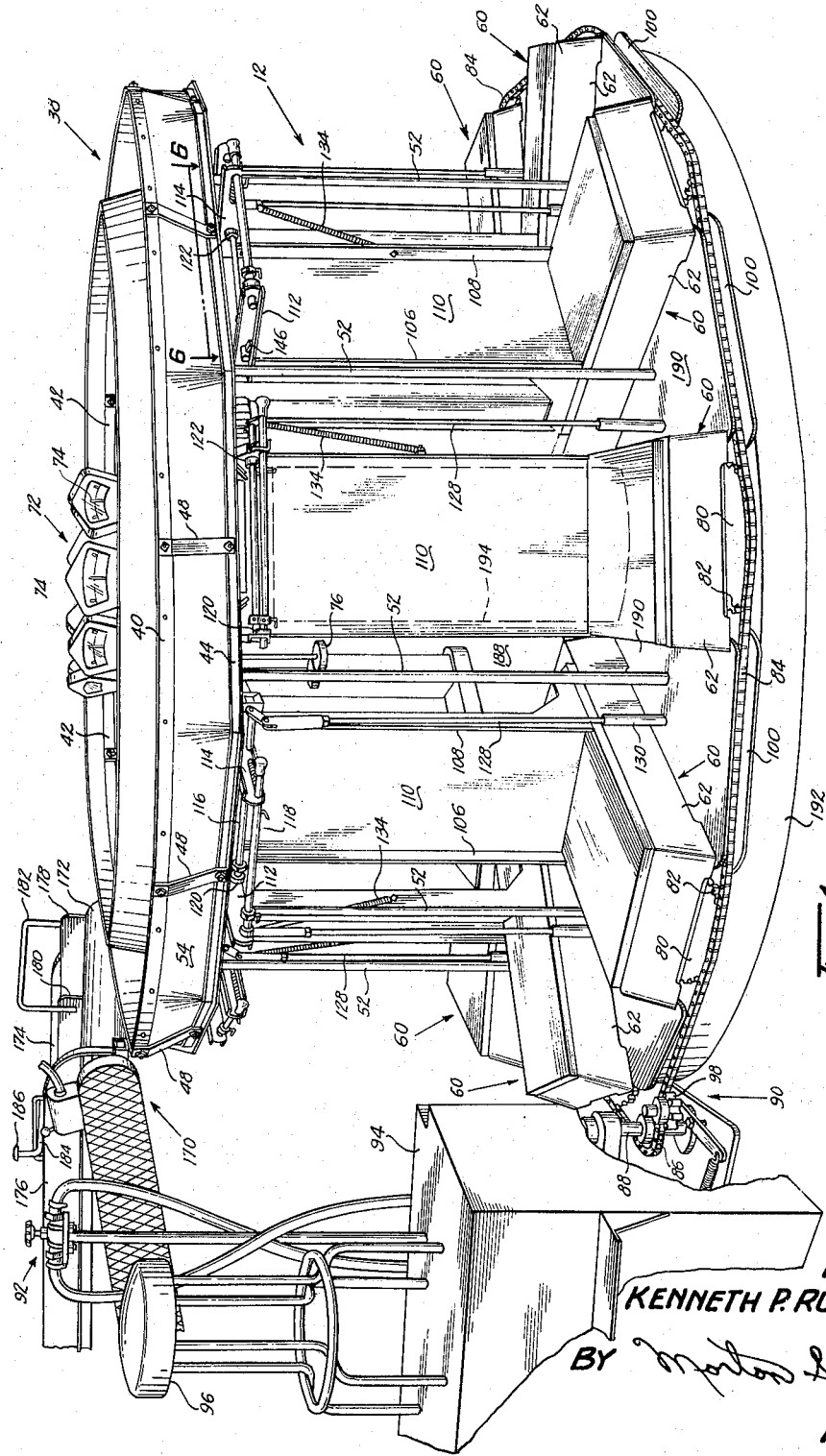
INVENTOR.
KENNETH P. RUTHERFORD
BY
ATTORNEY.

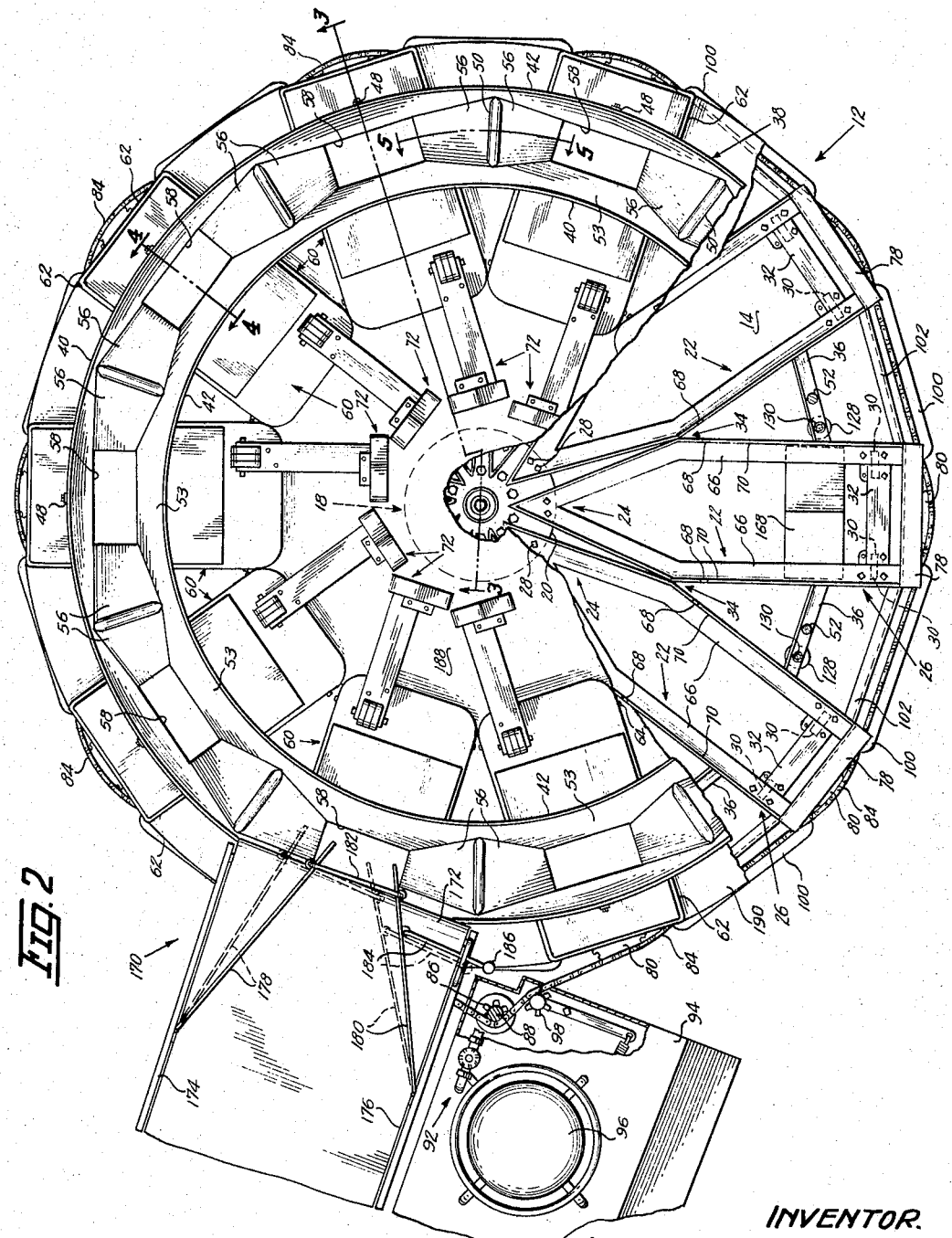

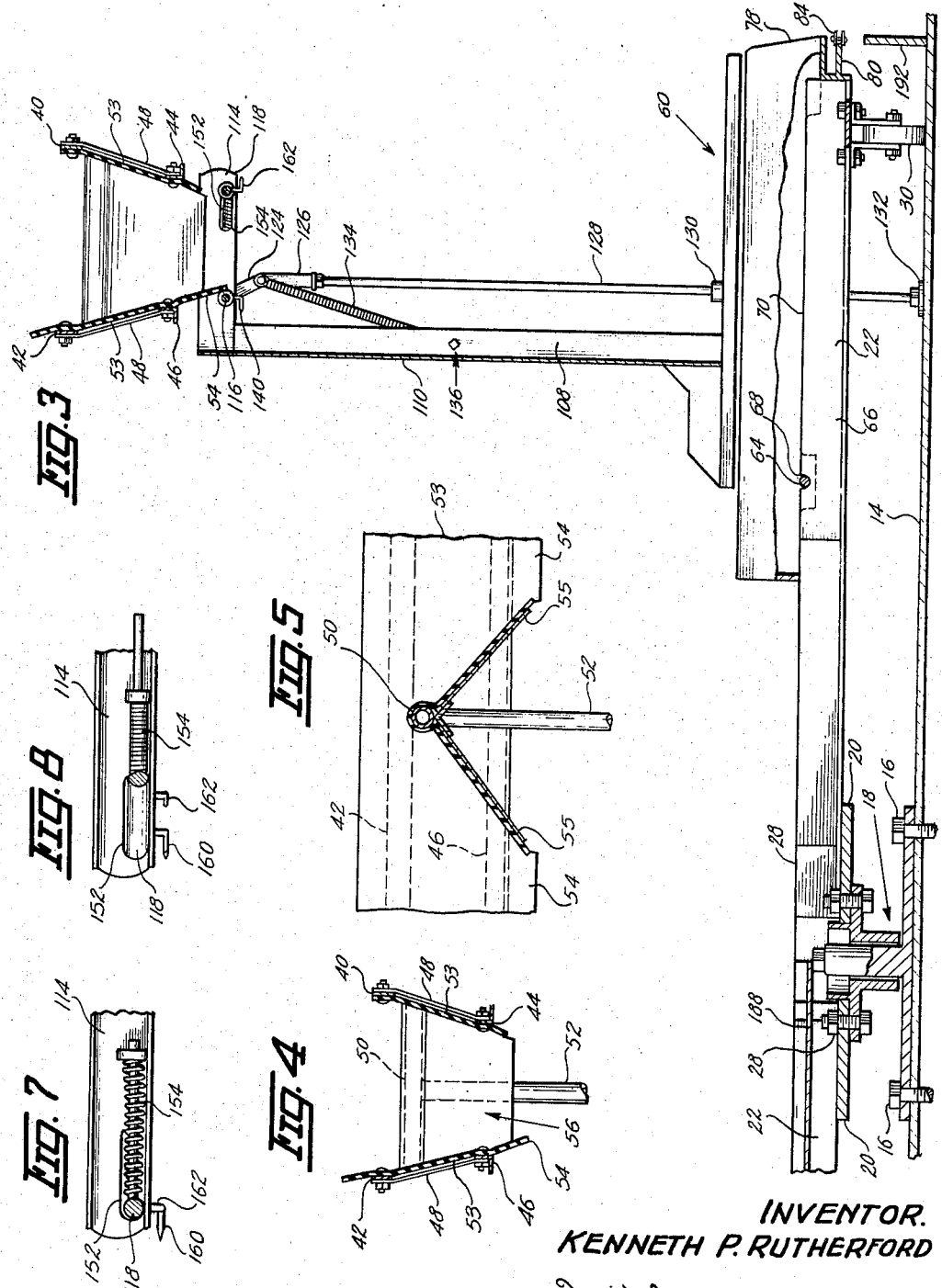

Nov. 2, 1965  K. P. RUTHERFORD  3,215,173
BAG FILLING AND WEIGHING MACHINE
Filed Jan. 29, 1962  4 Sheets-Sheet 4
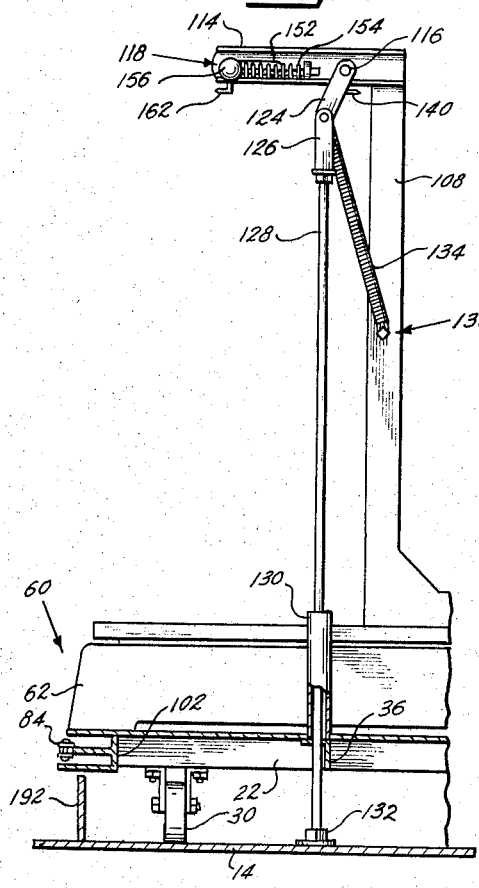
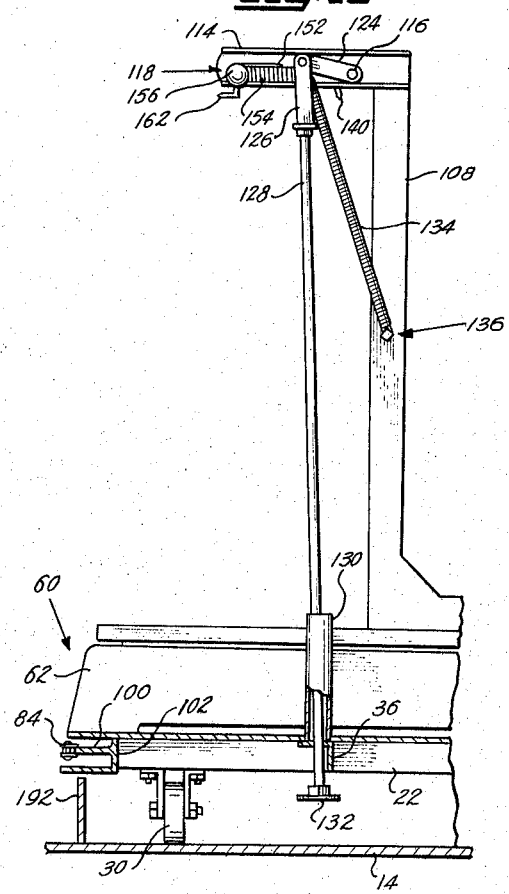
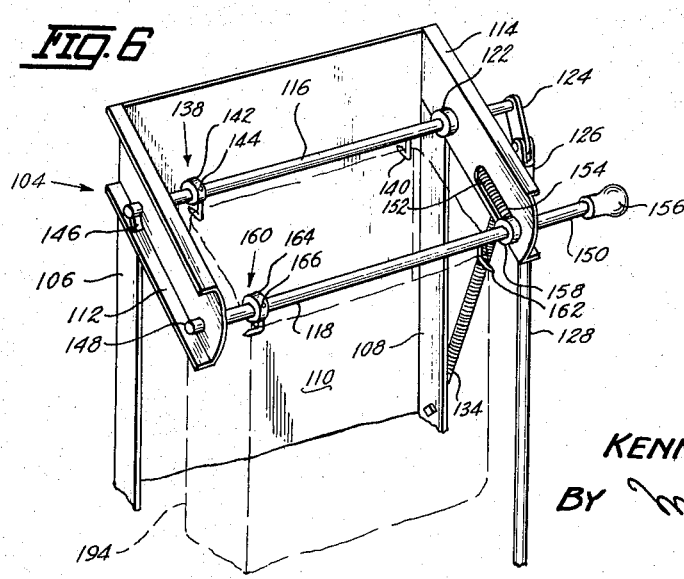
INVENTOR.
KENNETH P. RUTHERFORD
BY
ATTORNEY.

United States Patent Office 3,215,173
Patented Nov. 2, 1965

3,215,173
BAG FILLING AND WEIGHING MACHINE
Kenneth P. Rutherford, Burlington, Iowa, assignor to Rutherford Potato Company, Burlington, Iowa, a corporation of Iowa
Filed Jan. 29, 1962, Ser. No. 169,296
3 Claims. (Cl. 141—83)

This invention relates to improvements in machines for filling and weighing bags or sacks and while it has been particularly designed for the purpose of rapidly filling and accurately weighing one hundred pound bags of potatoes, it will be apparent that it may be used to good advantage for many other kinds of goods and materials that are packaged in bags or sacks.

In accordance with this invention one of the important objects contemplated is an improved rotating turntable or turret machine carrying a circular arrangement of filling hoppers which are successively brought into register with a continuous flow of material to be sacked or bagged.

Other objects and features of this invention include a machine of the above class that is operator controlled, has individual bag supporting means and weighing scales associated with each hopper, and means for controlling the speed of rotation of the turntable so that the length of time each hopper is in register with the flow of material can be selectively controlled in relation to the volume of flow as reflected on the scale reading.

A further object herein is to provide with the invention set forth, an operator actuated directional flow control means whereby the flowing or moving material to be sacked can be diverted entirely or in part, away from a bag being filled and into an adjacent bag or alternately diverted from one bag to another and back again so as to permit the operator to more accurately control the fill of each bag or sack according to the predetermined weight of the bags for a particular filling run.

Still another object herein includes novel bag holding or supporting means, and means to automatically release a portion of the bag supports after the filling operation to facilitate the removal of the bags for tying or sewing as may be required.

To attain these objects and such further objects as may appear herein, or be hereinafter pointed out, I make reference to the accompanying drawings forming a part hereof, in which:

FIG. 1 is a perspective view illustrating a preferred embodiment of my new bag filling and weighing machine, FIG. 2 is a top plan view of the machine shown in FIG. 1 with portions cut away to more clearly illustrate the construction thereof, FIG. 3 is a cross sectional view taken on the line 3—3 of FIG. 2, FIG. 4 is a cross sectional view taken on the line 4—4 of FIG. 2, FIG. 5 is a cross sectional view taken on the line 5—5 of FIG. 2, FIG. 6 is a fragmentary top perspective view of the bag holding and release assembly taken from the line 6—6 of FIG. 1, FIG. 7 is a fragmentary side view of the bag supporting and release mechanism taken from the line 7—7 of FIG. 6, FIG. 8 is a view similar to FIG. 7 but showing the mechanism in a moved position, FIG. 9 is a side view of one of the bag holding and weighing assemblies shown partly in section and in position for fully supporting a bag to be filled, and FIG. 10 is a view similar to FIG. 9 but showing the bag supporting elements tripped for partially releasing the bag.

Referring to the drawings this machine designated generally by the numeral 12 (FIG. 1) is a revolving turntable or turret type unit. It includes a large circular or disc shaped base plate 14 which can be placed on the floor at any desired location. At the axis of plate 14 and secured thereto by bolts 16 there is mounted a revolvable ball bearing hub assembly 18 (FIGS. 2 and 3) of any suitable construction which carries the attached horizontal circular platform 20 for rotation therewith. A plurality of like scale supporting frame members 22 are arranged to extend radially from platform 20 like the spokes of a wheel and for this purpose each frame, for which I preferably use angle material, has an inner V or wedge shaped end portion 24 with its outer end portion 26 being generally rectangular. The apex end 24 of each frame 22 is bolted 28 to platform 20 in concentric relationship to the axis thereof (FIG. 2) and the outer end of each frame extends radially therefrom to the outer end portion or perimeter of the base plate 14 where it is movably supported thereon by a means of a pair of spaced ball bearing caster wheels 30 that are secured to and depend from a transverse brace or crossbar 32 or frame 22. Each frame 22 is in abutting engagement with each adjacent frame 22 as at 34 as seen in FIG. 2 at the point where each V shaped end portion 24 begins and also by a connecting transverse bar 36 between the respective rectangular frame portions 26 so that all frames 22 move in unison as will later appear. Preferably I have used ten frames 22 but this is only illustrative and may be increased or decreased as desired.

A circular or ring shaped filling hopper assembly indicated generally by the numeral 38 (FIG. 1) is smaller in diameter than the base plate 14 and is concentrically disposed in relation thereto in an elevated position for rotatary movement with frames 22 as follows. Assembly 38 comprises a ring shaped rigid frame structure which includes the upper opposed and spaced frame members or bars 40 and 42 (FIG. 4) and the lower opposed spaced frame members or bars 44 and 46. Members 40 and 44 define the outer extremity of assembly 38 and members 42 and 46 define the inner extremity. It will be noted that the lateral spacing between the lower frame members 44 and 46 is less than that between the upper frame members 40 and 42 so as to provide downwardly converging hopper sides.

The vertical relationship of the upper and lower frame members of assembly 38 is maintained by a plurality of spaced vertical braces or metal straps 48 secured thereto as shown in FIG. 4 and the lateral spacing is maintained by a plurality of spaced horizontal transverse supports 50, of which there is one disposed in vertical alignment with the central portion of each transverse bar 36 between the respective frames 22. The elevated position of assembly 38 is maintained by vertical supporting members such as pipes or poles 52 which are secured at respective ends to bars 36 and supports 50.

The respective inner and outer sides of the framing for assembly 38 are enclosed or walled in by any suitable material secured to the frame and preferably for this purpose I have used a relatively stiff rubber belting or sheeting circular material 53 with the material forming the inner wall between frame members 42 and 46 (FIG. 4) extending somewhat further below the lower extremity of frame 46 than on the outer wall, such extension being identified by the numeral 54 and serving as a deflector means as will later appear. This provides an inclined or hopper-like circular trough as shown in crosssection in FIG. 4. Within such trough at spaced intervals I have placed an inverted V shaped baffle plate member 55 and covered it with similar material 56 as the wall enclosure material, and one such baffle is situated relative to each support 50 so that the apex of each baffle is carried by such support. The effect of this arrangement is that opposed sides of adjacent baffles 56 extend downwardly into the trough toward each other but are sufficiently spaced apart at their lower ends to define the respective open hopper bottoms 58 disposed directly over the respective frames 22 as can be determined from FIG. 2. Thus, the hopper assembly 38 is actually a succession of individual compartments or hoppers that are each associated directly with one of the scale mechanisms which I will now describe.

A one thousand pound platform scale 60 is removably mounted on each frame 22. These scales are of a type which are commercially available and no invention is claimed in them per se. Normally the base 62 of such scales are wheel mounted but I have removed the wheels and front wheel axle (not shown) and have left the rear wheel axle 64 seen in FIG. 3. The base 62 is supported on the horizontal portions 66 of the angle frames 22 and within the rectangular portion 26 thereof, and a notch 68 in the vertical side 70 of frame 22 is adapted to receive the axle 64 on each side of scale base 62 to hold it against accidental sliding movement while disposed on frame 22. The scale head 72 will be disposed in a circular formation within the hopper assembly 38 as seen in FIGS. 1 and 2. Scales 60 can be manhandled for positioning as described and will have to be first tilted in order to pass the scale heads 72 beneath assembly 38. The scale bases 62 can then be slid relative to frames 22 until the axles 64 drop into the notches 68. Thus arranged, each scale base 62 is directly below one of the hopper openings 58.

Scale heads 72 are of the type in which the registering needle or pointer 74 is centered when the desired weight on base 62 has been reached and the weight desired is determined by selecting an appropriate weight 76 in a well known manner. Heads 72 are also appropriately marked "over" and "under" (not shown) at respective opposite sides of the center needle position and are positioned to be easily seen or read by an operation stationed outside of plate 14 as will be later referred to in more detail.

Rotary motion is imparted to frames 22 by a chain drive in the following manner. At the outer end of each frame 22 I have secured a crossbar 78 between the respective frame sides (FIG. 2) and each bar 78 carries a projecting securely attached segment 80 having a toothed perimeter 82 (FIG. 1). An endless steel roller chain 84 encircles the outer extremities of frames 22 in engagement with each segment 80 and also engages a toothed gear or sprocket wheel 86 on shaft 88 which is part of drive assembly 90 located just beyond the perimeter of plate 14. Any suitable power means may be utilized to turn gear 86 so as to rotate frames 22 by chain 84 and thus the same is not shown in detail. However, it can be pointed out that I have utilized a hydraulic motor connected to an electrically operated oil pressure pump to which I have connected a control valve 92. An elevated operator's stand 94 is built over assembly 90 to support a stool or seat 96 from which an operator can view the bagging operation at a point above the hopper assembly 38, and valve 92 (FIG. 1) is conveniently located relative to such seat. A spring loaded idler spocket 98 in contact with chain 84 near gear 86 is provided for maintaining proper tension in a well known manner and a chain support plate is provided as a shoulder or ledge-like extension 100 from a crossbar 102 secured between the outer adjacent ends of the respective frames 22. Chain 84 moves over and is supported by shoulders 100 so that with the alternate succession of segments 80 and shoulders 100 around this machine, there is a substantially continuous support for the heavy chain 84.

Each scale 60 is equipped with an identical bag supporting and release mechanism identified generally by the numeral 104 (FIG. 6) so that a description of one such mechanism will suffice for all and like numerals will be given to all like parts. At each side of the scale base 62 on approximately a vertical line with the inner frame member 46 of assembly 36 I have attached the respective upstanding posts or supports 106 and 108 that extend upwardly to the lower extremity of assembly 38, and transversely of posts 106 and 108 there is secured a rigid wall 110 of sheet metal or the like. Since this wall will be in the line of fall of material being bagged, as will become apparent, and particularly since such material is potatoes for my purposes, the hopper wall portion 54 (FIG. 4) is arranged to extend downwardly over the top of the wall to serve as a baffle or deflector for potatoes falling through hopper opening 58. Extending outwardly and horizontally over base 62 from the top of the respective posts 106 and 108 are the spaced parallel channel members or bars 112 and 114 which carry the spaced bag supporting rods 116 and 118 as follows. Rod 116, which I shall call the rear or inner bag support, is rotatably journalled at respective ends through bearing members 120 and 122 in bars 112 and 114 so as to project outwardly from each respective bar. On the projected end of rod 116 relative to bar 114 I have secure one end of a rigid link 124 for rotation therewith and pivotally secured to the other end of link 124 is a second link 126 to which there is attached an elongated depending shaft or rod 128. Shaft 128 extends slidably down through an upstanding collar or sleeve 130 secured to the transverse bar 36 between frames 22 and the bottom of shaft 128 is provided with an enlarged base or foot 132 that moves relative to plate 14 and in close proximity thereto as the frames 22 and scales 60 are rotated by chain 84. Engagement of plate 14 by foot 132 is the normal bag supporting position of rod 116 and to yieldingly maintain this position a spring member 134 extends from the pivot point of links 124 and 126 downwardly to a point of attachment 136 on post 108.

Intermediate bars 112 and 114, rod 116 carries a pair of spaced hooks 138 and 140 which are in the form of L shaped prongs and in bag supporting position have their pointed pronged portion on a horizontal plane extending rearwardly or toward wall 110 as seen in FIG. 6. Hook 140 is permanently fixed, but hook 138 is carried by a collar 142 that is slidable on rod 116 and can be secured at any desired place thereon by a set screw 144. The purpose for this is to permit its use with different size bags. The projected end of rod 116 relative to bar 112 is provided with a lug or boss 146 that rotates with rod 112 and engages the channel sides of such bar at times (FIG. 6) to serve as a stop means for limiting the rotation of such shaft and thereby limiting the rotation of hooks 138 and 140 toward and away from their bag supporting position as described.

The forward or outer bag supporting rod 118 has one end 148 rather loosely extended through bar 112 so as to permit a limited amount of play and lateral twisting and the other end 150 of rod 118 extends through a longitudinal slot 152 in bar 114 and is spring loaded 154 on the outer side of bar 114 to yieldingly maintain it at the forward or outermost portion of such slot as seen in FIG. 9. Since rod 118 is manually manipulated at times, a hand grip member 156 may be provided on end 150. Spring 154 will hold rod 118 against transverse sliding relative to bars 112 and 114 in one direction and a collar 158 on rod 118 just inside bar 114 serves the same purpose for the opposite direction. Intermediate bars 112 and 114, rod 118 is provided with hooks 160 and 162 similar in shape to hooks 138 and 140 previously described. Hook 162 is fixedly mounted the same as hook 140 but has its pronged point portion extending outwardly or oppositely disposed to the direction of hook 140. Hook 160 is slidably adjustable on rod 118 similarly to hook 138 on rod 116 and includes the collar 164 and set screw 166 for this purpose. The pointed prong portion of hook 160 extends parallel to the longitudinal axis of rod 118 or at right angles to the direction of the other hooks. Since the weight of assembly 104 just described is carried by the scale head 62, it will be understood that such weight will be reflected in a proper scale adjustment so that the reading of needle 74 will be accurate as to acutal weight of material being weighed.

At a selected point on the base plate 14 I have secured a modified inverted V shaped ramp 168 (FIG. 2) in the line of travel of the foot member 132 on the respective rods or shafts 128 so that in the operation of this invention, which will be later described in full detail, each foot 132 will ride over such ramp so as to become elevated (FIG. 10) and cause a rotation of rod 116 with a corresponding rotation of hooks 138 and 140.

In FIGS. 1 and 2 the discharge end of a conveyor 170 is shown adjacent the operator's seat 96 and since any suitable conveying means may be employed to deliver material to this machine 10, the details thereof are not shown as no invention is claimed in such conveyor per se. Preferably, however, suitable control means (not shown) for starting and stopping the conveyor 170 are located conveniently to the operator's seat 96 although this is not necessary to the proper functioning of this invention.

The conveyor 170 shown is of the belt type 172 and one of the features which enhances the efficient operation of this invention resides in a directional flow control means for the discharge end of the conveyor 170. In this respect the discharge end of the conveyor includes the fixed upstanding sideboards or rails 174 and 176 for channelling the material being moved in a well known manner. However, since the end of the conveyor is of a fixed width, material moving on belt 172 would normally define a stream of flow of substantially the same width and in a direct line longitudinally thereof. I have therefore provided a pair of horizontal elongated deflectors or guide members 178 and 180 which are respectively pivotally attached at one end to the respective sideboards 174 and 176 at opposed points which are spaced inwardly from the discharge end of belt 172 as shown in FIG. 2. Such guides or deflectors 178 and 180 are in effect movable sideboards being adapted for movement across belt 172 and in close proxvimity thereto to engage any material moving thereover. The other or forward ends of deflectors 178 and 180 project slightly outwardly from the discharge end of belt 172 where they are held in a reduced spaced relationship relative to the total width of belt 172 by a connecting bar or yoke 182 which is pivotally secured at respective ends thereto. A pusher or control rod 184 is pivotally attached at one end to the guide 180 near bar 182 and at the other end carries a handle means 186 which extends over the sideboard 176 for convenient access by the operator. It will thus be appreciated that the guides or deflectors 178 and 180 form a funnelled or restricted discharge channel for material moving on belt 172 and an operator by pushing or pulling on handle 186 can selectively direct the flow of material not only to different points within the width limits of belt 172 but also in directions offset from the longitudinal axis of the belt.

A floor plate 188, substantially level with the tops of frames 22 covers the hub assembly 18 and the wedge end portions 24 of frames 22, and intermediate the rectangular portions 26 of the frames 22, wedge shaped floor members 190 are provided which complement the floor 188. Also a wide band enclosure 192 is placed about the perimeter of plate 14 as shown in FIG. 1.

With this invention constructed as described, it will operate in the following manner. The machine 12 is located relative to the discharge end 170 of a suitable conveyor so that the discharge point is over the filling hopper assembly 38 as shown in FIG. 1. This provides a continuous flow of material to be bagged as one of the chief objectives is rapidity and accuracy in bagging and weighing. The scales 60 on frames 22 rotate counter-clockwise so that ramp 168 (FIG. 2) is located approximately the distance of four frames 22 from the filling position below the conveyor 170 and in the line of travel of the filled bags. An operator will occupy the elevated seat 96 where he can control the operation of the conveyor, the rotation of machine 12, the deflector members 178 and 180 and where he can observe the scale head 72 relative to each bag being filled as well as the interior of the filling hoppers 38.

As indicated earlier, machine 12 has been designed particularly for bagging and weighing potatoes in one hundred pound bags, such bags being indicated in broken lines and identified by the numeral 194. An operator for attaching empty bags 194 to the bagging supporting assembly 104 (FIG. 6) is preferably stationed at a point diametrically opposite to the operator's stand 94. Since bags 194 are of burlap, the pronged hooks 138, 140, 160 and 162 are ideally suited for piercing and engaging the same and can, of course, be efficiently utilized with other bags of heavy material. It will also be appreciated that different type hooks, clips or fastening means can be employed to suit a particular bag material without departing from the principles herein disclosed. The bag attaching operator opens a bag and first engages one side with hooks 138 and 140. Hook 160 is then engaged and as this is done, rod 118 is pushed by handle 156 against spring 154 as shown in FIG. 8. As handle 156 is released, a portion of the bag is held in position to be pierced by hook 162 with assembly 104 in the position shown in FIG. 9. The spacing of hooks 138 and 140 and 160 and 162 and the spacing of rods 116 and 118 is such that a one hundred pound potato bag is held at the top in a fully stretched open position with the bottom resting on the scale base 60. For smaller bags, hooks 138 and 160 can be adjusted as described above.

With bags 194 being attached as indicated, the operator on stand 94 starts rotation of frames 22 by means of valve 92 and also starts conveyor 170 in operation. The speed of rotation of frames 22 is relatively slow but in the device as shown in FIG. 2 with ten frames, it has been successfully demonstrated that it is capable of one complete revolution per minute to thus bag and weigh ten one hundred pound bags in each minute of operation. As potatoes, or other material, flow through hopper opening 58 into a particular bag, the operator constantly observes the filling and the needle 74 on the scale head 72. During this time, opening 58 will be slowly moving transversely of the discharge end of belt 172 and for a limited time both the opening 58 for the bag being filled and the following opening 58 for the succeeding bag to be filled will simultaneously be within filling range. This condition will prevail during the time that the apex of baffle 56 is intermediate the conveyor sideboards 174 and 176. Consequently as the steady flow of potatoes pours into a given bag 194 and the needle 72 approaches its central position, the operator may shuttle deflectors 178 and 180 back and forth across belt 172 to lessen the flow into the almost full bag and thus prevent overfilling. Such shuttling action starts the filling of the succeeding bag in the amount of the flow directed away from the almost full bag and as soon as the proper weight is indicated, all the flow is directed into the succeeding bag. The speed of rotation of into the succeeding bag. The speed of rotation of frames 22 can, of course, be speeded up or slowed depending upon the volume of flow of potatoes on conveyor 170 and, as the circumstances may require, the flow of potatoes can be diverted entirely from the bag to a succeeding bag rather than only partially diverted, and then redirected into the first bag. In other words, the volume of flow as to a particular bag can be progressively tapered off as the weight limit on a particular bag is approached, and completely diverted at the proper time, and at the same time no time is lost relative to bagging and weighing the diverted flow as it is being received in a succeeding bag. Thus the flow of potatoes can remain continuous and constant through the entire bagging and weighing operation.

As bags 194 are filled, they receive some lateral support from wall 110, if necessary, and as each frame 22 with a filled bag moves over ramp 168 (FIG. 2), the foot 132 on shaft 128 rides up and over the same to the position shown in FIG. 10 whereby hooks 138 and 140 on rod 116 are rotated so that their pronged points extend downwardly permitting the rear engaged portions of the bag to fall free and leaving the full bag supported only by hooks 160 and 162. The bags in this position are removed from hooks 160 and 162 and from the scale 60 by an operator stationed approximately diametrically opposite to conveyor 170. Such operator in a rapid operation (not shown) appropriately secures each open bag end and tips the bag into an adjacent conveyor for delivery to a collection point. The bag attaching operator, previously mentioned, is actually stationed closely adjacent the bag removal operator and keeps all assemblies 104 supplied with empty bags as full bags are removed.

It will be appreciated from the foregoing that this invention provides a most efficient and rapid means for bagging and weighing bulky material. The handling of the material is at a minimum for in actual practice the potatoes after being initially unloaded into a washing machine are mechanically washed, waxed (if desired) and conveyed to machine 12 where the only actual handling occurs in removing the filled bags as described.

It is submitted that the invention shown and described is aptly suited to achieve the purposes intended and is characterized by a combination of highly useful and mutually cooperating elements that combine their respective and proportionate functions in accomplishing the objects sought to be obtained.

It will be understood that the phraseology employed herein is for the purpose of description and not for limitation and that modifications and changes in the construction and arrangement of this invention can be made within the scope of what is claimed, without departing from the spirit and purpose thereof. It is thus intended to cover by the claims, any modified forms of structure or mechanical equivalents which may be reasonably included within their scope.

I claim:
1. In a bag filling and weighing machine:
 (a) a rotatable hub assembly,
 (b) a plurality of elongated like frames each having an inner and outer end respectively,
 (c) said inner ends being secured to said hub assembly in a concentric arrangement so that said frames extend radially therefrom,
 (d) wheel means carried by the outer end of each frame for movement over a floor or the like,
 (e) a weighing scale with visible weight registering indicia on each frame,
 (f) a fixed bag supporting means carried by each scale so that weight in a bag attached thereto will act on the scale,
 (g) a release mechanism on each bag supporting means for partially releasing a bag to facilitate its manual removal from the scale,
 (h) a circular trough,
 (i) means supporting said trough in elevated relationship to said scales,
 (j) a plurality of spaced inverted V shaped baffles in said trough defining an endless succession of hoppers with open bottoms,
 (k) each open hopper bottom being in register over and above one of said scales,
 (l) said hoppers adapted to receive and direct a supply of material directly into a bag to be weighed,
 (m) means to rotate said frames, and
 (n) means to automatically actuate said bag release mechanism after a bag has been filled and weighed.

2. A machine as defined in claim 1 wherein the means to rotate said frames includes
 (a) toothed segments secured to and projecting from the outer end of each frame,
 (b) an endless chain drive encircling said frames in engagement with said segments, and
 (c) a powered sprocket drive member in operable engagement with said chain drive.

3. A device as defined in claim 1 including the combination therewith of:
 (a) a conveyor means disposed to discharge a continuous flow of material into said trough at a predetermined point, and
 (b) manually operable directional flow control means on said conveyor means for selectively diverting the flow of material in whole or in part to and from any two adjacent hoppers in said trough as said trough rotates past a registering position with said conveyor means.

References Cited by the Examiner

UNITED STATES PATENTS

| | | | |
|---|---|---|---|
| 619,834 | 2/99 | Nickerson | 141—314 XR |
| 1,959,937 | 5/34 | Thatcher | 222—408 XR |
| 1,385,498 | 7/21 | Schaffer | 177—118 XR |
| 2,275,335 | 3/42 | Achatz | 141—283 XR |
| 2,763,109 | 9/56 | Baker | 141—166 XR |
| 3,057,382 | 10/62 | Baker | 141—131 XR |
| 3,097,459 | 7/63 | Rausch | 141—314 XR |
| 3,108,647 | 10/63 | Harmon et al. | 177—58 XR |

LAVERNE D. GEIGER, *Primary Examiner.*

RAPHAEL M. LUPO, *Examiner.*